United States Patent Office 3,438,971
Patented Apr. 15, 1969

3,438,971
DIENE RUBBER-NITRILE COPOLYMER-UNSATURATED TRIGLYCERIDE BLENDS HAVING INCREASED TOUGHNESS
George E. Walker, Longmeadow, Mass., assignor to Monsanto Company, St. Louis, Mo., a corporation of Delaware
No Drawing. Continuation-in-part of application Ser. No. 485,119, Sept. 3, 1965. This application June 22, 1967, Ser. No. 647,933
Int. Cl. C08f *19/18, 29/56;* C09d *3/80*
U.S. Cl. 260—23.7                                    12 Claims

ABSTRACT OF THE DISCLOSURE

There is disclosed a novel polymeric product having highly desirable ductility and toughness comprising an intimate mixture of (A) a blend containing 1.0 to 15.0 percent by weight of a diene rubber and 99.0 to 85.0 percent by weight of an interpolymer formed of 20.0 to 95.0 percent by weight of a monovinylidene aromatic hydrocarbon and 80.0 to 5.0 percent by weight of an unsaturated nitrile of the group consisting of acrylonitrile, methacrylonitrile and mixtures thereof and (B) about 0.2 to 7.0 percent by weight, based upon the weight of the composition, of a triglyceride stable at the processing temperatures for the composition.

Cross reference to related application

The present application is a continuation-in-part of copending application Ser. No. 485,119, filed Sept. 3, 1965, bearing the same title and by the same inventor, now abandoned.

Background of the invention

The present invention relates to polymeric products having increased ductility and toughness and, more particularly, relates to certain diene rubber/monovinylidene aromatic hydrocarbon-unsaturated nitrile interpolymer blends containing an additive to increase the ductility and toughness of products formed therefrom.

As has been well known, the addition of diene rubber to styrene-acrylonitrile type interpolymers has proven particularly advantageous in improving the toughness of the products made therefrom. This has been true with respect to both mechanical blends of the rubber in the styrene-acrylonitrile type interpolymer and to compositions containing grafted diene rubber. Generally, grafted compositions containing 7.0 to 22.0 percent by weight rubber have been considered necessary to obtain the degree of toughness or resistance to impact and ductility necessary for many applications. The cost of compositions containing this percentage of rubber has had a tendency to militate against more widespread utilization of ABS-type compositions. This has been particularly true for container applications wherein the ABS materials would compete with paper and metal.

It is an object of the present invention to provide a novel composition containing a styrene-acrylonitrile type interpolymer blended with relatively minor amounts of diene rubber to provide highly desirable toughness and ductility for various applications.

It is also an object to provide a novel method for making relatively economical compositions of desirable toughness and ductility containing styrene-acrylonitrile type interpolymer blended with a diene rubber.

Summary of the invention

It has now been found that the foregoing and related objects can be readily attained in a polymeric composition comprising a monovinylidene aromatic hydrocarbon-unsaturated nitrile interpolymer blended with diene rubber and containing 0.2 to 7.0 percent by weight, based upon the total weight thereof, of a flexicizing agent comprising a triglyceride, and preferably about 2.0 to 5.0 percent by weight thereof.

Such compositions have evidenced greatly increased ductility as measured by ultimate tensile elongation before failure under load, improved properties of toughness or impact resistance as measured by the falling dart and Izod impact tests and the ability of the products formed therefrom to be flexed or bent upon themselves. Compositions of styrene-acrylonitrile interpolymer blended with diene rubbers and modified according to the present invention containing 3.0 to 6.0 percent by weight of rubber component have evidenced properties comparable to unmodified compositions containing 7.0 to 10.0 percent by weight of the rubber component. The advantage in cost by using low rubber compositions is readily apparent and permits utilization of the compositions of the present invention in competition with less expensive materials such as paperboard and metal for all-purpose packaging applications, as well as for many other applications where toughness and ductility are important. In addition to highly beneficial application in low rubber blends, the improvement in properties provided by the concepts of the present invention may be incorporated in formulations containing up to 15 percent of the rubber component where desired albeit with lesser advantage above about 12 percent.

The compositions which may be modified in accordance with the present invention include mechanical blends or mixtures of the diene rubber in the styrene-acrylonitrile type interpolymer and polyblends wherein at least a portion of the interpolymer has been prepared by polymerizing resin-forming styrene and acrylonitrile type monomers in the presence of the diene rubber. Generally, the polymeric compositions with which the present invention is concerned contain 1.0 to 15.0 percent by weight of the diene rubber and, correspondingly, 99.0 to 85.0 percent by weight of the interpolymer, and preferably 1.0–12.0 percent of the rubber.

Generally, the blends wherein at least a portion of the interpolymer is polymerized in the presence of a diene rubber have proven more highly advantageous in terms of the various physical properties of the composition. Such chemical blends as is already known have greater or lesser amounts of the interpolymer chemically combined with the diene rubber, depending on factors such as the proportion of the interpolymer prepared in the presence of the diene rubber, the polymerization technique (e.g., mass, suspension, mass-suspension, emulsion, or solution) employed, the polymerization conditions, etc.

Diene rubber

The diene rubber component can be any diene rubber or mixture of diene rubbers, i.e., any rubbery polymer (a polymer having a second order transition temperature not higher than 0° C., preferably not higher than —20° C., as determined at ASTM test D-746-52T) of one or more conjugated 1,3-dienes, e.g., butadiene, isoprene, piperylene, chloroprene, etc. Such rubbers include homopolymers of conjugated 1,3-dienes, interpolymers of conjugated 1,3-dienes with one another, and interpolymers of one or more conjugated 1,3-dienes with up to an equal amount by weight of one or more copolymerizable monoethylenically-unsaturated monomers, such as monovinylidene aromatic hydrocarbons, (e.g., styrene; an ar-alkylstyrene, such as the o-, m-, and p-methylstyrenes, 2,4-dimethylstyrene, the ar-ethylstyrenes, p-t-butylstyrene, etc.; an alpha-alkylstyrene, such as alpha-methylstyrene, alpha-ethylstyrene, alpha-methyl-p-methylstyrene, etc.; vinyl naphthalene, etc.), ar-halo monovinylidene aromatic hydrocarbons (e.g., the o-, m-, and p-chlorostyrenes, 2,4-dibromostyrene, 2-methyl-4-chlorostyrene, etc.), acrylonitrile, methacrylonitrile, alkyl acrylates, (e.g., methyl acrylate, butyl acrylate, 2-ethylhexyl acrylate, etc.), the corresponding alkyl methacrylates, acrylamides (e.g., acrylamide, methacrylamide, N-butyl acrylamide, etc.), unsaturated ketones (e.g., vinyl methyl ketone, methyl isopropenyl ketone, etc.), alpha-olefins (e.g., ethylene, propylene, etc.), vinyl pyridines, vinyl esters (e.g., vinyl acetate, vinyl stearate, etc.), vinyl and vinylidene halides (e.g., the vinyl and vinylidene chlorides and bromides, etc.), and the like.

Depending upon the polymerization process employed, the rubber can (and frequently does) also contain up to about 2.0 percent, advantageously 0.5 to 1.5 percent, of a cross-linking agent, based on the weight of the rubber-forming monomer or monomers. The cross-linking agent can be any of the agents conventionally employed for cross-linking diene rubbers, e.g., divinylbenzene, diallyl maleate, diallyl fumarate, diallyl adipate, allyl acrylate, allyl methacrylate, diacrylates and dimethacrylates of polyhydric alcohols, e.g., ethylene glycol dimethacrylate, etc.

According to a preferred embodiment of the invention, the diene rubber is a rubber which has been prepared with proper regulation of the degree of conversion and/or of a cross-linking agent content to provide a rubber having a swelling index at least as high at 11, preferably 11 to 20, in benzene, as determined by (a) maintaining a mixture of 0.3 gram of the rubber and 75 ml. of benzene in total darkness for 24 hours at 20° centigrade, (b) filtering the mixture through a 100 mesh stainless steel screen, (c) washing the benzene-insoluble portion of the rubber with 10 ml. of benzene and determining the weight of the insoluble, solvent-swollen polymer, (d) evaporating an aliquot of the filtrate to dryness to determine the weight of the benzene-soluble portion of the rubber, and (e) calculating the swelling index (i.e., the ratio of solvent-swollen gel to dry gel) in accordance with the equation:

Swelling index=

$$\frac{\text{Wt. in grams of benzene-swollen polymer}}{0.3-\text{wt. in grams of benzene-soluble}}$$

A preferred group of diene rubbers are those which consist essentially of 85 to 100 percent by weight of butadiene and/or isoprene and up to 15 percent by weight of a monovinylidene aromatic compound or unsaturated nitrile. Butadiene copolymers having a combined styrene or arcylonitrile content of 5.0 to 15.0 percent by weight are particularly preferred.

Interpolymer

The monovinylidene aromatic hydrocarbon-unsaturated nitrile component of the blends is an interpolymer of a monovinylidene aromatic hydrocarbon (e.g., styrene; an ar-alkylstyrene, such as the o-, m-, and p-methylstyrenes, 2, 4-dimethylstyrene, the ar-ethylstyrenes, p-t-butylstyrene, etc.; an alpha-alkylstyrene, such as alpha-methylstyrene, alpha-ethylstyrene, alpha-methyl-p-methylstyrene, etc.; vinyl naphthalene, etc., and mixtures thereof) and an unsaturated nitrile of the group consisting of acrylonitrile, methacrylonitrile, and mixtures thereof.

These interpolymers may, if desired, contain up to about 20.0 percent by weight of one or more other copolymerizable ethylenically-unsaturated monomers, such as alkyl acrylates (e.g., methyl acrylate, ethyl acrylate, butyl acrylate, octyl acrylate, etc.), the corresponding alkyl methacrylates, unsaturated acids (e.g., acrylic acid, methacrylic acid, etc.), unsaturated amides (e.g., acrylamide, methacrylamide, N-butyl acrylamide, etc.), ar-halostyrenes (e.g., the o-, m-, and p-chlorostyrenes, p-bromostyrene, etc.), dialkyl maleates and fumarates (e.g., the dimethyl, diethyl, dibutyl, and dioctyl maleates and fumarates, etc.), conjugated dienes (e.g., butadiene, isoprene, etc.), and the like. Also, if desired, the inter- polymers can contain minor amounts, e.g., about 0.05 to 5.0 percent by weight, of a chain transfer agent, such as a higher alkyl mercaptan, alpha-methylstyrene dimer, etc.

Among the preferred interpolymers are those which consist essentially of 20 to 95 percent, preferably 60 to 85 percent, by weight of a combined monovinylidene aromatic hydrocarbon and 80 to 5 percent, preferably 40 to 15 percent, by weight of combined acrylonitrile and/or methacrylonitrile.

As mentioned above, the blends with which the present invention is most desirably employed are those wherein at least a portion of the interpolymer has been prepared in the presence of the diene rubber to cause some chemical combination to occur between the rubber and interpolymer components. In describing such blends it has become customary to use the term "graft copolymer substrate" to designate the diene rubber component because of the large number of cases in which it has not been found possible to extract any of the diene rubber from the blends with the usual rubber solvents, although it is believed that some of the polymer chains of the rubber may not be in actual chemical combination with the interpolymer in some of the blends. "Graft copolymer superstrate" is the term used to designate that portion of the interpolmer which has been prepared in the presence of the diene rubber. At least a small amount of the polymer is not in chemical combination with the substrate because of the less-than-100 percent grafting efficiency of conventional graft copolymerization reactions.

Any monovinylidene aromatic hydrocarbon-unsaturated nitrile interpolymer employed in addition to the graft copolymer superstrate usually has a specific viscosity of about 0.04 to 0.15, preferably about 0.07 to 0.1, measured as a solution of 0.1 percent of the polymer in dimethylformamide at 25° centigrade. This additional interpolymer can have been prepared by any of the conventional mass, solution, emulsion, or suspension polymerization techniques and is blended with the graft copolymer in any suitable manner, e.g., by milling, extrusion blending, recovery from mixed latices by drum drying, spray drying, coagulating, etc.

A preferred embodiment of the invention is the modification of blends of (1) a monovinylidene aromatic hydrocarbon-unsaturated nitrile superstrate/diene rubber substrate graft copolymer containing 15 to 90 (preferably 30 to 70, and even more preferably 40 to 60) parts by weight of superstrate/100 parts by weight of substrate and having at least 80 percent of the superstarte chemically combined with the substrate and (2) a separately prepared monovinylidene aromatic hydrocarbon-unsaturated nitrile interpolymer in such proportions that the graft copolymer substrate constitutes 2.0 to 16.0 percent by weight of the blend.

From the standpoint of recognizing optimum economic utilization of the compositions, chemical blends containing 2.0 to 7.0 percent by weight total rubber may be advantageous for competition with paperboard and metal.

Triglycerides

As will be appreciated, the triglycerides of the present invention are organic acid esters of glycerol. Although the acids in the triglyceride may have saturated carbon chains, unsaturated acids are preferred because of the lower melting point generally exhibited by the triglycerides thereof at equivalent chain length and apparently more beneficial properties. However, mixtures of saturated and unsaturated acids may be employed as can be mixed acid esters.

The acid, or acids, of the triglycerides may have chain lengths or molecular weights depending upon the desired melting point thereof and the minimum boiling point or decomposition point required for processability of the formulation. Styrene-acrylonitrile type interpolymers generally are processed at temperatures of about 150 to 300° centigrade, and the acids of the triglycerides should provide a stable compound at a temperature of at least 20° centigrade above the processing temperature for the particular polymeric composition and preferably about 30° centigrade thereabove. Since the triglyceride most advantageously is a liquid at ambient to low elevated temperatures to facilitate blending thereof with the polymeric composition, the acids generally have a chain containing 14 to 26 carbon atoms, and preferably about 16 to 24 carbon atoms.

Exemplary of the many triglycerides that may be advantageously employed in the present invention are the triglycerides of the unsaturated acids: linoleic, oleic, licanic, ricinoleic, conjugated linolenic and erucic acids, and combinations thereof. Conveniently, such triglycerides are provided by relatively pure natural oils such as linseed, cottonseed, safflower, soybean, rapeseed, castor, and corn oils. The preferred triglycerides are those of oleic and linoleic acids, and the combinations thereof with each other and with minor amounts of saturated acids, which conveniently are added as a relatively pure natural oil such as corn oil.

The amount of flexicizer or triglyceride in the composition may vary from 0.2 to 7.0 percent by weight and is preferably about 2.0 to 5.0 percent by weight. As the amount of triglyceride is increased, the heat distortion temperature decreases so that the amount added should be maintained at lower levels for applications where this property is important. Moreover, at levels of 5 percent by weight and above, the enhancement of toughness properties provided thereby appears to be reduced.

The triglycerides are preferably admixed with the styrene-acrylonitrile type interpolymer and diene rubber during extrusion blending of the interpolymer and diene rubber so as to ensure an intimate and homogeneous mixture thereof with the polymer and also to minimize handling and processing of the materials. Similarly, mill rolling the components may be employed or the triglycerides may be advantageously added to the interpolymer and diene rubber during any alternative process of blending thereof. Mill rolling with the admixing of the triglycerides with the preblended polymeric composition is less advantageous because of the problems in attempting to obtain absorption and uniform dispersion of the triglyceride throughout the mixture. As a further alternative, the triglycerides might be added to the reaction mixture during the copolymerization of the styrene-acrylonitrile type monomer, etc.

It has been found that the addition of the triglycerides of the present invention to the preblended polymeric composition particularly, and to some degree to the interpolymer and diene rubber during the blending thereof, tends to produce excessive plasticity in the composition so that it is difficult to extrude the composition because of the lack of friction on the screw of the extrusion apparatus. Accordingly, it has been found highly advantageous to add with the triglyceride a relatively small amount of colloidal silica aerogel. In this manner, the silica aerogel acts as a liquid absorbent which substantially eliminates liquid build-up at the extrusion screw and permits higher amounts of liquid additives in the composition.

The triglyceride-containing polymeric composition of the present invention can be modified by conventional additives such as stabilizers, antioxidants, fillers, colorants, etc., if so desired.

Description of the preferred embodiments

Exemplary of the efficacy of the present invention are the following specific examples wherein there is utilized a chemical blend of acrylonitrile-butadiene-styrene, prepared as follows unless otherwise indicated.

A graft copolymer latex is prepared by a process wherein 50 parts of an 80:20 mixture of styrene and acrylonitrile are polymerized in an aqueous latex containing 100 parts of a cross-linked rubbery butadiene-styrene (90:10) copolymer having a swelling index of 11 to 20 in benzene so as to form a product in which at least 80.0 percent of the polymerized styrene-acrylonitrile is chemically combined with the rubber substrate of the graft copolymer. The graft copolymer latex is stabilized and blended with a latex containing 135 parts of a styrene-acrylonitrile (80:20) copolymer having a specific viscosity of about 0.07, measured as a solution of 0.1 percent of the polymer in dimethyl formamide at 25° centigrade. The polymers are co-coagulated from the mixed latices and a coagulum is recovered wherein the rubber copolymer comprises about 35 percent by weight. This coagulum is extrusion blended at about 218° centigrade with a styrene-acrylonitrile (72:28) bead copolymer having a specific viscosity of about 0.08 measured as a solution of 0.1 percent of the polymer in dimethyl formamide at 25° centigrade, in varying ratios to provide the desired rubber content.

Example 1

A blend as outlined above was prepared wherein the rubber copolymer comprised 4.0 percent by weight of the composition. Test specimens made therefrom exhibited a tensile strength at yield of 9900 p.s.i. and at failure of 9300 p.s.i. The tensile elongation at failure was 7 percent.

A length of the polymer was subjected to repeated bending upon itself manually in a test which has been designated "subjective toughness" wherein the ability of the material to resist repeated bending (toughness) is evaluated on a scale from 1 at the weakest to 5.0 for a material of maximum toughness. In such a test, a sheet of about 20 to 30 mils, 8 inches by 1 inch, is bent upon itself, back to back. The value ascribed to the unmodified blend specimen was 1.0.

Example 2

A blend similar to that of Example 1 was prepared except that 2.0 percent by weight corn oil was extrusion blended with the poly-blend while blending the coagulum and bead copolymer.

Specimens produced therefrom exhibited a tensile strength at yield of 7370 p.s.i. and at failure of 5970 p.s.i. The tensile elongation at failure was 28 percent. In the subjective toughness test, the value determined therefor was 4.

Example 3

A series of tests was run to determine the effect of varying the rubber content and the nature of the rubber employed; i.e., emulsion polymerized or suspension polymerized. The data from the tests is reported in Table 1 below:

TABLE 1

| Corn Oil, Percent by Wt. | Styrene-Acrylonitrile, Percent by Wt. | Suspension Rubber, Percent by Wt. | Emulsion Rubber, Percent by Wt. | Tensile Stress at Yield, p.s.i. | Tensile Stress at Fail, p.s.i. | Tensile Elongation at Fail, Percent |
|---|---|---|---|---|---|---|
| 2.0 | 93.5 | 4.0 | 0.0 | 6,400 | 5,000 | 29.7 |
| 2.0 | 94.0 | 0.0 | 4.0 | 6,800 | 5,600 | 32.4 |
| 2.0 | 94.0 | 1.9 | 2.1 | 6,500 | 5,300 | 23.6 |
| 2.0 | 94.0 | 1.2 | 2.8 | 6,900 | 5,600 | 34.0 |

Example 4

A series of tests was run utilizing different natural oils in combination with a polymer blend containing 4.0 percent by weight of the rubber component. The test data is set forth in Table 2 below:

TABLE 2

| Oil | Acid and Fraction | Subjective Toughness | Tensile Stress at Yield, p.s.i. | Tensile Stress at Fail, p.s.i. | Tensile Elongation at Fail, Percent | Tensile Impact, Ft.-Lb./In.$^2$ |
|---|---|---|---|---|---|---|
| Control, 4% Rubber | | 1.0 | 9,900 | 9,300 | 7.0 | 14.9 |
| Linseed | 0.7 oleic-linoleic, 0.3 linoleic | 3.5 | 7,200 | 6,000 | 33.0 | 13.8 |
| Tung | 0.1 oleic, 0.8 conjugated linolenic | 3.3 | 8,700 | 7,200 | 23.0 | 10.6 |
| Oiticica | 0.1 saturated, 0.8 licanic | 1.5 | 8,700 | 7,700 | 16.0 | 12.8 |
| Safflower | 0.3 oleic, 0.5 linoleic | 3.5 | 7,200 | 5,600 | 19.0 | 14.9 |
| Soybean | 0.1 saturated, 0.25 oleic, 0.5 linoleic | 4.3 | 7,000 | 5,800 | 25.0 | 13.1 |
| Rapeseed | 0.3 oleic, 0.5 erucic, 0.1 linoleic | 3.8 | 7,100 | 5,700 | 32.0 | 15.6 |
| Castor | 0.1 oleic, 0.85 ricinoleic | 2.2 | 8,500 | 6,500 | 19.0 | |
| Cottonseed | 0.1 saturated, 0.5 oleic, 0.3 linoleic | | 7,400 | 6,000 | 28.0 | |
| Corn Oil | do | 4.0 | 7,370 | 5,970 | 28.0 | 14.9 |

Example 5

A series of tests was conducted to determine the effect of varying the amount of the rubber component and of the corn oil upon the properties of the composition. The test data is set forth in Table 3 below. As can be seen therein, the triglycerides tend to produce an overall adverse effect upon the properties of the compositions containing 18.0 percent rubber instead of providing enhancement of the properties thereof.

TABLE 3

| Rubber, Percent by Wt. | Corn Oil, Percent by Wt. | Falling Dart, Ft.-Lb. | Heat Dist. Temp., °C. | Tensile Stress at Yield, p.s.i. | Tensile Stress at Fail, p.s.i. | Tensile Elong. at Fail, Percent | Izod Impact, Ft.-Lb./In. of notch | | |
|---|---|---|---|---|---|---|---|---|---|
| | | | | | | | 73° F. | 0° F. | −40° F. |
| 7.5 | 0.0 | 5 | 87.5 | 9,100 | 5,900 | 19.0 | 0.76 | 0.73 | 0.49 |
| 7.5 | 4.0 | 36 | 86.5 | 5,900 | 5,200 | 53.0 | 1.2 | 0.95 | 0.76 |
| 7.5 | 5.0 | 42 | 86.5 | 5,500 | 4,800 | 42.0 | 1.3 | 0.98 | 0.79 |
| 7.5 | 6.0 | 42 | 84.5 | 5,200 | 4,500 | 39.0 | 1.1 | 0.92 | 0.76 |
| 7.5 | 7.0 | 36 | 84.0 | 5,000 | 4,200 | 31.0 | 1.0 | 0.90 | 0.77 |
| 11.5 | 0.0 | 32 | 87.5 | 8,100 | 6,000 | 21.0 | 1.8 | 1.1 | 0.81 |
| 11.5 | 3.0 | 66+ | 84.5 | 5,600 | 4,900 | 45.0 | 3.3 | 1.6 | 1.2 |
| 11.5 | 5.0 | 60 | 83.5 | 5,100 | 4,300 | 30.0 | 2.4 | 1.3 | 1.0 |
| 11.5 | 7.0 | 62 | 81.5 | 4,600 | 3,800 | 27.0 | 2.2 | 1.3 | 1.0 |
| 11.5 | 9.0 | 24 | 82.0 | 4,300 | 3,500 | 30.0 | 2.1 | 1.1 | 0.96 |
| 18.0 | 0.0 | 66+ | 83.5 | 6,500 | 5,800 | 31.0 | 5.5 | 1.9 | 1.3 |
| 18.0 | 3.0 | 66+ | 83.5 | 5,100 | 4,400 | 31.0 | 5.2 | 2.3 | 1.6 |
| 18.0 | 5.0 | 66+ | 81.0 | 4,500 | 3,800 | 24.0 | 4.4 | 2.3 | 1.5 |
| 18.0 | 7.0 | 66+ | 81.5 | 4,000 | 3,400 | 30.0 | 4.0 | 2.3 | 1.5 |
| 18.0 | 9.0 | 47 | 78.0 | 3,500 | 3,000 | 26.0 | 3.4 | 2.4 | 1.5 |

Example 6

A series of tests was conducted to determine the effect of 1 percent by weight of various natural oils in a blend containing 6.0 percent by weight rubber. The test data therefrom is set forth in Table 4 below:

TABLE 4

| | Control | Cottonseed Oil | Corn Oil | Olive Oil |
|---|---|---|---|---|
| Subjective Toughness: | | | | |
| 73° F | 1.5 | 4.2 | 4.2 | 4.3 |
| 43° F | 1.25 | 2.0 | 1.75 | 2.5 |
| Tensile Elongation at Fail, percent | 8.0 | 40.0 | 40.0 | 37.0 |
| Chemical Resistance Critical Strain, Percent | 0.6 | 0.6 | 0.6 | |

Example 7

Another series of tests was conducted wherein the amount of rubber and the amount of corn oil was varied in order to determine the effect of the variations upon the physical properties of the compositions. The test data is set forth in Table 5 below:

TABLE 5

| | I | II | III | IV | V | VI |
|---|---|---|---|---|---|---|
| Rubber, percent by Wt | 7.5 | 4.0 | 4.0 | 4.0 | 4.0 | 5.0 |
| Corn Oil, percent by Wt | 0.0 | 0.5 | 1.0 | 2.0 | 5.0 | 1.0 |
| Tensile Impact | 19 | 9 | 11 | 14 | 14 | 10 |
| Heat Distortion Temperature, °C | 95.0 | 94.0 | 93.0 | 92.0 | 91.5 | 94.0 |
| Tensile Stress at Yield, p.s.i. | 7,100 | 7,000 | 6,600 | 6,200 | 4,800 | 6,400 |
| Tensile Stress at Failure, p.s.i. | 6,200 | 6,300 | 5,800 | 4,800 | 4,100 | 5,400 |
| Tensile Elongation at Failure, Percent | 20 | 18 | 21 | 25 | 3 | 20 |
| Critical Strain, Percent | 0.60 | 0.59 | 0.60 | 0.60 | 0.72 | 0.56 |
| Subjective Toughness | 4+ | 1.3 | 1.7 | 4.0 | 3+ | 3.70 |

In addition to the improvement in properties set forth in the foregoing examples, additional testing has established an improvement in gloss and a benefit in odor at the lower levels of flexicizer addition (below about 4.0 percent), and by permitting the use of lower rubber content for equivalent toughness. The chemical resistance and corrosion resistance also have been found to be excellent.

Thus, it can be seen from the foregoing examples and specification that the present invention provides polymeric compositions containing acrylonitrile-styrene type copolymer blended with relatively small amounts of diene rubber having significantly enhanced properties of ductility and toughness, particularly in the lower range of rubber content so as to enable economic competition with materials such as paperboard and metal for all-purpose container applications as well as with other materials for various applications where such properties are significant and cost may be a factor. In this manner, there is provided a polymeric composition affording significant advantages in terms of properties for even more widespread application of styrene-acrylonitrile interpolymer blends with diene rubber.

It is obvious that many variations can be made in the products and processes set forth above without departing from the spirit and scope of this invention.

What is claimed is:

1. A composition comprising an intimate mixture of (A) a blend containing 1.0 to 15.0 percent by weight of a diene rubber and 99.0 to 85.0 percent by weight of an interpolymer formed of 20.0 to 95.0 percent by weight of a monovinylidene aromatic hydrocarbon and 80.0 to 5.0 percent by weight of an unsaturated nitrile of the group consisting of acrylonitrile, methacrylonitrile and mixtures thereof and (B) about 0.2 to 7.0 percent by weight, based upon the weight of said composition, of a triglyceride stable at the processing temperatures for said composition, said triglyceride being an organic acid ester of glycerol, said organic acid being an unsaturated carboxylic acid containing from 14 through 26 carbon atoms per molecule.

2. The composition of claim 1 wherein at least a portion of said interpolymer has been prepared by polymerizing the resin-forming monomers in the presence of the diene rubber.

3. The composition of claim 1 wherein said triglyceride constitutes about 2.0 to 5.0 percent by weight of said composition.

4. The composition of claim 1 wherein said interpolymer contains 60.0 to 85.0 percent by weight of the monovinylidene aromatic hydrocarbon and 40.0 to 15.0 percent by weight of the unsaturated nitrile.

5. The composition of claim 1 wherein said diene rubber contains 85.0 to 100.0 percent by weight of a diene selected from the group consisting of butadiene and isoprene and up to 15.0 percent by weight of a monovinylidene aromatic hydrocarbon.

6. The composition of claim 1 wherein the acids of said triglyceride are selected from the group consisting of oleic, linoleic and the combination thereof.

7. The composition of claim 1 wherein the blend consists of (A) a monovinylidene aromatic hydrocarbon-unsaturated nitrile superstrate/diene rubber substrate graft copolymer containing 15.0 to 90.0 parts by weight of superstrate/100 parts by weight of substrate and (B) a resinous monovinylidene aromatic hydrocarbon/unsaturated nitrile interpolymer.

8. The composition of claim 1 additionally containing a minor amount, less than 3.0 percent by weight, of a colloidal silica gel as an absorbent for said triglyceride.

9. The composition of claim 1 wherein said rubber content is 2.0 to 7.0 percent by weight of the composition.

10. A composition comprising an intimate mixture of (A) a blend of (1) an interpolymer containing 60.0 to 85.0 percent by weight of a monovinylidene aromatic hydrocarbon and 40.0 to 15.0 percent by weight of an unsaturated nitrile of the group consisting of acrylonitrile, methacrylonitrile and mixtures thereof, (2) a graft copolymer containing a diene rubber, a monovinylidene aromatic hydrocarbon and an unsaturated nitrile selected from the group consisting of acrylonitrile, methacrylonitrile and mixtures thereof, said graft copolymer having a superstrate of monovinylidene aromatic hydrocarbon and unsaturated nitrile and a diene rubber substrate, said superstrate being in the amount of 15.0 to 90.0 parts by weight per 100 parts by weight of substrate, said diene rubber comprising 1.0 to 15.0 percent by weight of the composition, and (B) about 0.2 to 7.0 percent by weight, based upon the weight of said composition, of a triglyceride stable at the processing temperature for said composition, said triglyceride being an organic acid ester of glycerol, said organic acid being an unsaturated carboxylic acid containing from 14 through 26 carbon atoms per molecule.

11. The composition of claim 10 wherein said monovinylidene aromatic hydrocarbon is styrene and wherein said unsaturated nitrile is acrylonitrile.

12. The composition of claim 10 wherein the acids of said triglyceride are selected from the group consisting of oleic, linoleic and the combination thereof.

References Cited

UNITED STATES PATENTS

| | | | |
|---|---|---|---|
| 2,485,592 | 10/1949 | Griess et al. | 260—23 |
| 2,889,308 | 6/1959 | Fedderson | 260—898 |
| 2,895,938 | 7/1959 | Ohlinger et al. | 260—85.5 |
| 2,941,977 | 6/1960 | Roche et al. | 260—892 |
| 3,090,767 | 5/1963 | Colgan et al. | 260—893 |
| 3,242,125 | 3/1966 | Walker et al. | 260—30.8 |
| 3,297,792 | 1/1967 | Coaker et al. | 260—876 |
| 3,324,060 | 6/1967 | Scopp et al. | 260—23 |
| 3,328,488 | 6/1967 | Delacretaz et al. | 260—880 |
| 3,354,108 | 11/1967 | Paradis et al. | 260—31.4 |

DONALD E. CZAJA, *Primary Examiner.*

R. A. WHITE, *Assistant Examiner.*

U.S. Cl. X.R.

260—23, 41, 41.5, 876, 893